US006233013B1

United States Patent
Hosier et al.

(10) Patent No.: US 6,233,013 B1
(45) Date of Patent: *May 15, 2001

(54) COLOR READOUT SYSTEM FOR AN ACTIVE PIXEL IMAGE SENSOR

(75) Inventors: Paul A. Hosier, Rochester; Jagdish C. Tandon, Fairport; Scott L. Tewinkle, Ontario, all of NY (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,613

(22) Filed: Oct. 23, 1997

(51) Int. Cl.[7] ................................................... H04N 5/335
(52) U.S. Cl. ..................... 348/308; 348/303; 348/304; 348/272
(58) Field of Search ................... 348/303, 302, 348/272, 308, 314, 311, 307, 304; 257/440; 250/208.1

(56) References Cited

U.S. PATENT DOCUMENTS

| 4,914,518 | * | 4/1990 | Suga | 348/296 |
|---|---|---|---|---|
| 4,942,473 | * | 7/1990 | Zeevi et al. | 348/306 |
| 5,144,442 | * | 9/1992 | Ginosar et al. | 348/362 |
| 5,148,268 | * | 9/1992 | Tandon et al. | 348/303 |
| 5,471,515 | | 11/1995 | Fossum et al. | 377/60 |
| 5,493,423 | * | 2/1996 | Hosier | 348/300 |
| 5,519,514 | * | 5/1996 | TeWinkle | 358/514 |
| 5,543,838 | | 8/1996 | Hosier et al. | 348/311 |
| 5,550,653 | * | 8/1996 | TeWinkle et al. | 358/514 |
| 5,576,763 | | 11/1996 | Ackland et al. | 348/308 |
| 5,587,596 | | 12/1996 | Chi et al. | 257/223 |
| 5,625,210 | | 4/1997 | Lee et al. | 257/292 |
| 5,631,704 | | 5/1997 | Dickinson et al. | 348/308 |
| 5,654,755 | * | 8/1997 | Hosier | 348/307 |
| 5,898,168 | * | 4/1999 | Gowda et al. | 348/311 |

FOREIGN PATENT DOCUMENTS

A2-757390   2/1997  (EP) .

OTHER PUBLICATIONS

Chem et al., Adaptive Sensitivity CCD Image Sensor, Proceedings of the SPIE.*

An Article by Mendis, Derneny and Fossum entitled "CMOS Active Pixel Image Sensor," 1995 IEEE International Solid–State Circuits Conference, paper TP 13.5.

* cited by examiner

Primary Examiner—Wendy R. Garber
Assistant Examiner—Mitchell White
(74) Attorney, Agent, or Firm—R. Hutter

(57) ABSTRACT

A full-color scanning array uses CMOS active pixel cells, or photogates, as photosensors. A set of photogates, each photogate being specifically filtered for one primary color, is associated with a common node. A clearing gate downstream of the common node applies a relatively high potential to a selected photogate, for the purpose of clearing any charge from the photogate. In this way, the integration time for the photogate can be started at a precise time, and the effective exposure time of each photogate can thereby be precisely controlled. Alternately, one of the set of photogates can be repeatedly cleared without a signal being read therefrom, allowing the array to operate in a monochrome mode.

6 Claims, 5 Drawing Sheets

COLOR READOUT SYSTEM FOR AN ACTIVE PIXEL IMAGE SENSOR

INCORPORATION BY REFERENCE

The present specification hereby incorporates by reference the teachings of U.S. Pat. Nos. 5,519,514 and 5,543,838, both assigned to the assignee hereof, as they relate generally to the concepts of integration times and readout routines for photosensors in full-color photosensor arrays.

FIELD OF THE INVENTION

The present invention relates to CMOS active pixel image sensors, also known as depleted-gate photosensors, or simply photogates. More specifically, the present invention relates to a system of transfer circuits by which a plurality of such photogates arranged in parallel can read out signals therefrom, such as in a full-color sensor array.

BACKGROUND OF THE INVENTION

Currently there are two prevalent basic technologies for image sensing with solid-state apparatus, such as in a television camera or document scanner: the charge-coupled device, or CCD, and CMOS. These two technologies have respective practical advantages and disadvantages. Recently, however, there has become available a new sensor technology which is intended to preserve the advantages of either CCDs or CMOS. This technology is known as "CMOS active pixel image sensors" or "depleted-gate photosensors," or most simply "photogates." In brief, a small single-stage CCD is fabricated for each photosensor, and the output of the single CCD stage is integrated with CMOS circuitry, such as a transfer circuit. The basic technology of constructing such photogates is disclosed in Mendis, Kemeny, and Fossum, "CMOS Active Pixel Image Sensor," IEEE Transactions on Electron Devices, Volume 41, No. 3, March 1994.

The basic structure of a photogate-based photosensor is as follows. There is disposed in a silicon structure one doped area with an exposed surface, known as a photogate, which accepts light thereon. When the photogate is exposed to light, a charge is created in the depletion layer thereof. A transfer gate is disposed next to the photogate. When it is desired to transfer the charge from the photogate, a potential is applied to the transfer gate, thus deepening the potential well there. This deepening of the potential well in the transfer gate causes the charge in the photogate to spill into the transfer gate, according to the basic CCD method. This CCD-type charge transfer occurs only once in the process, and the charge spilled into the transfer gate is converted into a voltage with associated CMOS circuitry.

Although photogates have numerous advantages, such as small size, CMOS-compatibility and relative ease of fabrication, certain problems must still be addressed in order to incorporate this technology in, for example, a full-color document scanner. In one type of full-color document scanner, there are provided three separate linear arrays, each array incorporating a relatively large number of photosensors. Each separate linear array of photosensors is filtered with one primary color filter, such as red, blue, and green. The three primary-color-filter linear arrays are then exposed to an original document moving past, to record video signals based on the exposed document. Because each individual linear array is filtered with one primary color, the ultimate output is three color separations based on the original image. One basic problem with using photogate technology as photosensors in this context is that, with currently-known designs of photogates, the integration time of each photogate, which is analogous to the shutter exposure time in a camera, is not readily controllable for individual pixels.

This lack of direct control my cause problems with accurate recording of individual color separations with the arrays of photogates.

DESCRIPTION OF THE PRIOR ART

In the prior art, the article "CMOS Active Pixel Image Sensor," referenced above, sets forth the basic operating principle of photogates.

U.S. Pat. No. 5,471,515 discloses a monolithic CMOS integrated circuit including a focal plane array of pixel cells, each one of the cells including a photogate, a readout circuit including at least an output field effects transistor, and a charge couple device adjacent the photogate. Each photogate has associated therewith at least one charge coupled device stage for transferring charge from the underlying portion of a substrate to a sensing node.

U.S. Pat. No. 5,519,514 discloses a CMOS-type color input scanning array in which there are provided three linear arrays of photosensors, each linear array of photosensors being filtered to be sensitive to one primary color. With each scan cycle of the linear arrays, the exposure period (i.e., integration time) of the photosensors in each array is precisely timed so that the optical "center of gravity" for each exposed area in the original image is superimposed for all of the primary color photosensors.

U.S. Pat. No. 5,543,838 discloses a signal multiplexing system for a color CMOS-type document scanner, in which for each pixel "cell" across the array, three photosensors, each photosensor being filtered to be sensitive to one primary color, are connected through a plurality of transfer circuits to a common node. For each of the three photosensors in the array, a transfer circuit controls the integration time for each photosensor, while another set of transfer circuits carries out the multiplexing through the common node.

U.S. Pat. No. 5,576,763 discloses an active pixel sensor comprising a photosite for generating and storing charge carriers, a transfer transistor and output and reset electronics. The gate of the transfer transistor and the photogate are defined in a single layer of polysilicon. By virtue of its unique structure, the device can operate without a clock or associated driving circuitry.

U.S. Pat. No. 5,587,596 discloses an active pixel sensor cell wherein a single MOS transistor is formed in a well to perform the functions conventionally performed by a photogate/photodiode, sense transistor and access transistor. Light energy striking the well varies the potential of the well which, in turn, varies the threshold voltage of the transistor. As a result, the current sourced by the transistor is proportional to the received light energy.

U.S. Pat. No. 5,625,210 discloses a photosensor device in which photodiodes are fabricated with CCD process steps and integrated into an active pixel architecture.

U.S. Pat. No. 5,631,704 discloses an active pixel imaging system which generates a differential output signal based on the differences in a viewed image between adjacent detected frames. When a particular pixel sensor is activated it generates a voltage signal corresponding to a previous frame's detected light intensity before the pixel is reset, thereby generating a voltage signal corresponding to a present frame's detected light intensity. Dickinson et al., "A 256× 256 CMOS Active Pixel Image Sensor With Motion Detection," 1995 IEEE International Solid-State Circuits Conference, paper TP 13.5, discloses a similar system.

European Patent Application EP-A2-757390 discloses an active pixel image sensor for full-color images, in which each pixel cell of the array includes two photogates, to receive red and green light respectively, and a CMOS-type photodiode for receiving blue light.

SUMMARY OF THE INVENTION

According to one aspect of the present invention, there is provided a photosensitive apparatus comprising a first photogate and a second photogate. Each photogate creates a charge in response to light impinging thereon, and includes a phototransfer gate associated therewith. A charge in the photogate spills into the associated phototransfer gate in response to an applied potential difference between the photogate and the phototransfer gate. A common node is associated with the first phototransfer gate and the second phototransfer gate, the common node being associated with an output line. A reset gate is disposed on a reset node on the output line, the reset gate being used to selectably apply a predetermined reset potential to the reset node. A clearing gate is disposed on the output line between the common node and the reset node. The clearing gate is actuable to apply a predetermined potential on the common node, thereby clearing any charge on at least one of the photogates.

According to another aspect of the present invention there is provided a method of operating a photosensitive apparatus. Each photogate in the apparatus creates a charge in response to light impinging thereon, and includes a phototransfer gate associated therewith. A charge in the photogate spills into the associated phototransfer gate in response to an applied potential difference between the photogate and the phototransfer gate. A common node is associated with the first phototransfer gate and the second phototransfer gate, the common node being associated with an output line. A reset gate is disposed on a reset node on the output line, the reset gate being used to selectably apply a predetermined reset potential to the reset node. A clearing gate is disposed on the output line between the common node and the reset node. The method comprises the step of applying a predetermined transfer potential to a selected phototransfer gate simultaneously with actuating the clearing gate, thereby clearing charge on a selected photogate and initiating an integration time for the photogate.

DETAILED DESCRIPTION OF THE INVENTION

In the following detailed description, certain conventions will be used in the various Figures, with like reference indices indicating like elements in different Figures; also, significantly, the letters which indicate a circuit element in a schematic will also refer to the potential on the circuit element in a timing diagram. First, the letters PG will represent a "photogate," while the letters PT will represent a transfer gate associated with a photogate; in order to distinguish a transfer gate immediately associated with a photogate from other transfer gates, the transfer gates immediately associated with photogates will be referred to below and in the claims as "phototransfer gates." The letter following either PG or PT will refer to the primary color which the particular element is supposed to be associated with, so that PGR will represent the red photogate, and PTG will represent the phototransfer gate associated with the green photogate, and so forth. PR represents a reset signal which will be applied on a reset node as shown, and PR2 represents the location of placing another reset, or "clearing" signal, as will be explained below. TT refers to a reset gate. $V_R$ represents a reset voltage, and $V_{out}$ represents both the output line and an output voltage on the output line.

Figure 4:
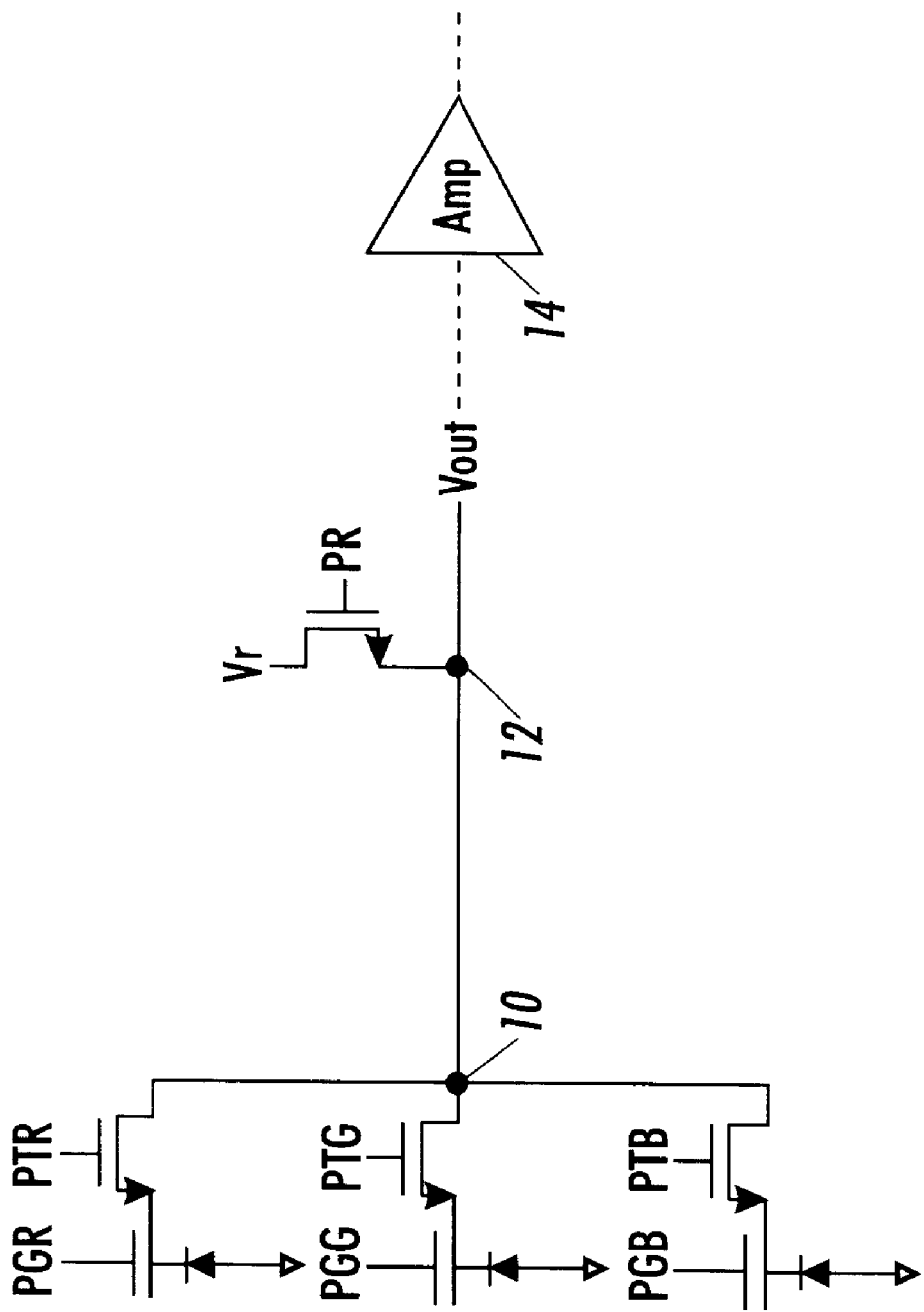
FIG. 4 shows a prior art color-capable set of photogates associated with a common transfer circuit.

FIG. 4 is a schematic of a basic parallel arrangement of photogates as would be found in a full-color-capable document scanner. The Figure shows three photosensitive photogates, one photogate intended to be sensitive to each primary color, red (PGR), green (PGG), and blue (PGB). Each photogate, in order to be made sensitive to one particular primary color, will typically include a translucent filter (not shown) over the exposed surface thereof, so that only light of the desired primary color will reach the photogate when the photogate is exposed to light. The three photogates shown in the Figure are intended to represent one pixel "cell" in a longer array of cells. In a preferred embodiment of the present invention, there would be provided a large number of three-photogate cells forming a linear array which is moved relative to the original image to be scanned in order to derive video signals representative of the original image.

As shown in the Figure, each photogate is associated with one phototransfer gate PTR, PTG, and PTB, through which charge is transferred from the photogate to, in this case, a common node 10 for all three photogates. Thus, when it is desired to read a signal from a particular phototransfer gate such as PTR, PTG, or PTB, the charge spilled thereby will be transferred directly to the common node.

Downstream of the common node of phototransfer circuits PTR, PTG, and PTB is a reset node 12, wherein a reset voltage Vr is selectably placed on the node so that, when a reset pulse is placed on gate PR, all of the phototransfer gates PTR, PTG, and PTB are set to a common reference so that another small area of the original image can be exposed, one primary color at a time.

Figure 5:
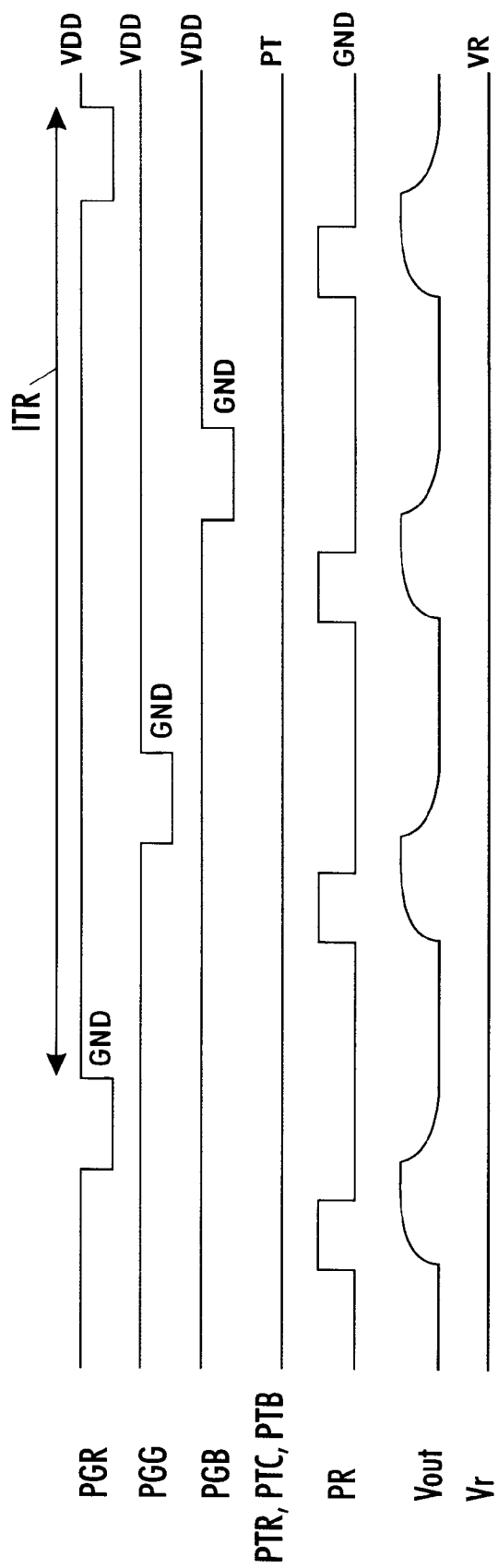
FIG. 5 is a timing diagram showing the operation of the transfer circuit of FIG. 4, according to the prior art.

FIG. 5 is a comparative timing diagram illustrating the behavior of the different circuit elements in the FIG. 4 circuit when the three photogates PGR, PGG, PGB are sequentially read out as $V_{out}$. As the voltage on each phototransfer gate PTR, PTG, PTB is constant, when it is desired to read out the charge on a particular photogate such as PGR, PGG, or PGB, the voltage associated with the particular photogate is momentarily dropped to ground (or, at least, a relatively low potential), as shown, so that the potential on the photogate such as PGR is momentarily made lower than the constant voltage on any of the phototransfer gates PTR, PTG, PTB. When the potential on the transfer gate is higher than that on the associated photogate, the charge that has previously been accumulated on the photogate will spill into the phototransfer gate (such as from PGR to PTR) and from there be loaded onto the common node 10 for read out through reset node 12 and an amplifier 14.

One key consideration in the basic design of the circuit of FIG. 4 is that any individual photogate such as PGR, PGG, or PGB is essentially always "on," in that the photogate is constantly creating charge as a result of light exposed thereon. When the charge on a particular photogate is momentarily dropped to ground, causing the charge accumulated in the photogate to spill to the phototransfer gate, all of the charge accumulated in the photogate since the previous spill is transferred to the phototransfer gate. Thus, as shown in FIG. 5, the integration time for PGR, shown as ITR, is the entire time from the end of one drop to ground to the end of the next drop. In this architecture, the integration time for a particular photogate (which is necessarily the effective exposure time of the photogate on the image being scanned) is restricted by the readout routine by which charges specific to particular colors are read out. It would be preferable to provide a system in which the integration time of an individual photogate could be made more independent of the readout routine: U.S. Pat. No. 5,519,514, incorporated by reference above, explains why precise and independent control of the integration times of different color-sensitive photosensors is desirable in a color document scanner.

Figure 1:
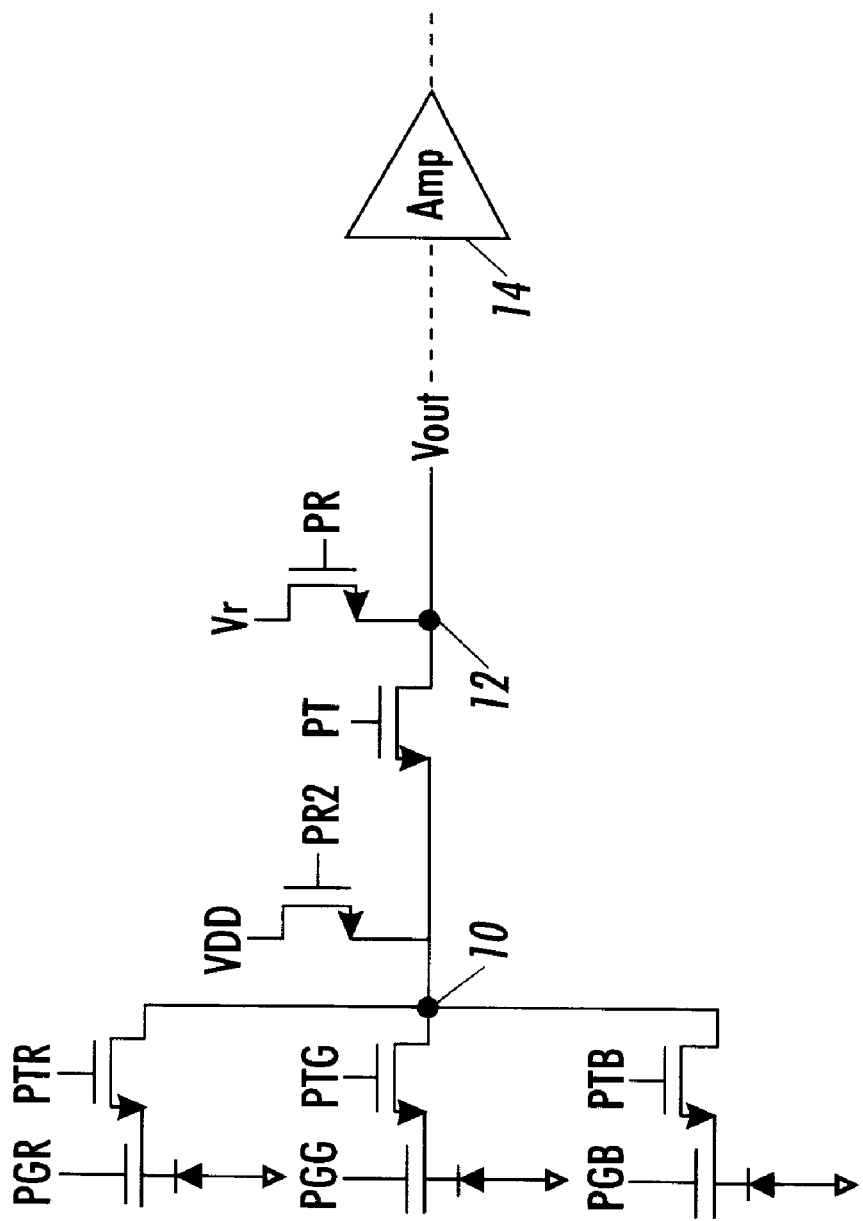
FIG. 1 is a schematic diagram of a pixel cell, comprising three primary-color-sensitive photogates, along with associated transfer circuitry, according to the present invention.
Figure 2:
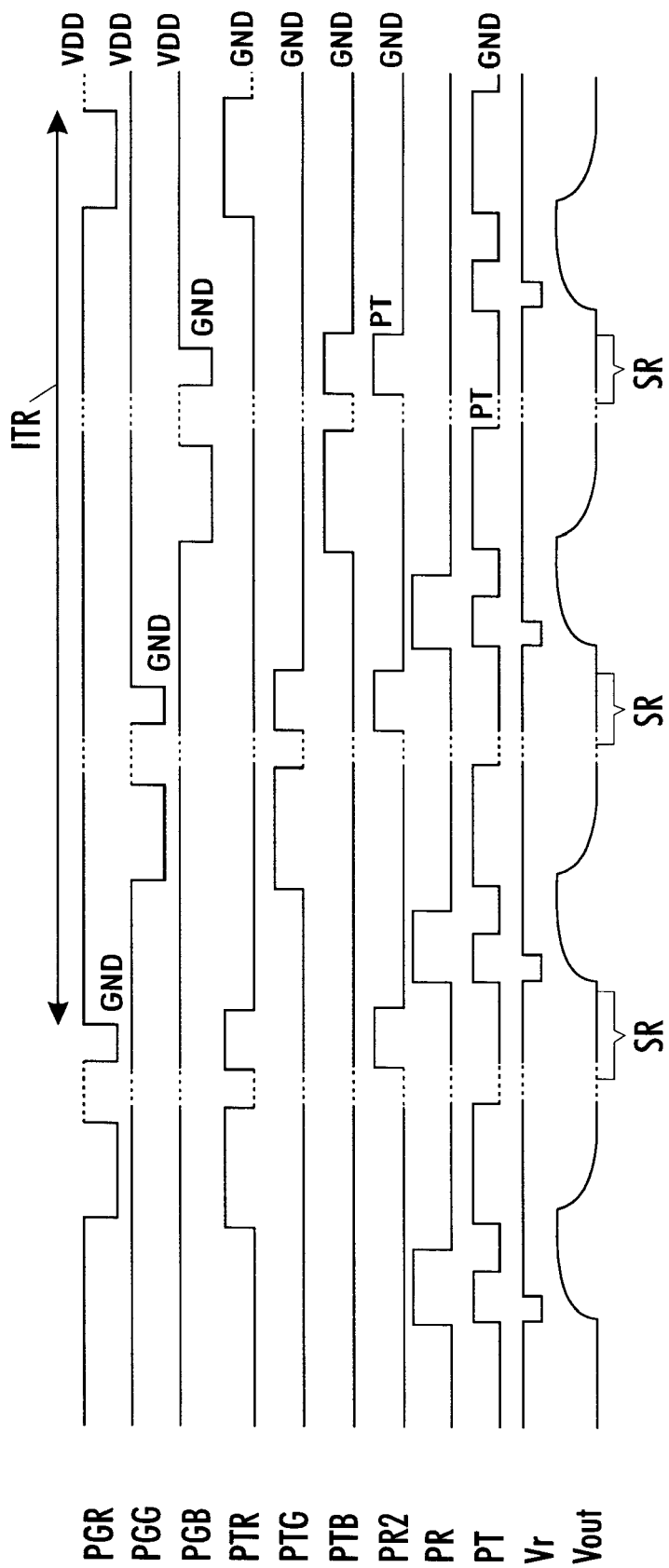
FIG. 2 is a timing diagram of potentials applied to various circuit elements in the schematic of FIG. 1, according to one method of the present invention.

FIG. 1 is a schematic view of a pixel cell comprising three primary-color photosensors arranged in parallel relative to a transfer circuit, according to the present invention. Three photogates PGR, PGG, and PGB, each being filtered by a primary-color translucent filter (not shown), and associated with a phototransfer gate PTR, PTG, and PTB respectively, are connected in parallel to a common node. Downstream of the common node is a reset gate PR, as well as a transfer gate PT, and a second reset gate PR2 which selectably applies a predetermined "discharge voltage" VDD onto the common output line, as shown. FIG. 2 is a timing diagram showing the operation of the various circuit elements in reading out charges from the photogates.

Looking at the top lines, PGR to PTB, in FIG. 2, a clear pattern can be seen that, in sequence, the potential on a photogate such as PGR is momentarily dropped, while simultaneously the potential on the phototransfer gate immediately associated with the photogate, such as PTR, is simultaneously raised from ground: in other words, during the drop in potential on the photogate, the potentials on the photogate and the phototransfer gate momentarily switch polarities, thus creating a potential difference therebetween. Moving across the top lines of FIG. 2, it can be seen that, first, the red photogate PGR and its red phototransfer gate PTR switch polarities, then the green photogate PGG and green phototransfer gate PTG switch polarities, and then finally the blue photogate PGB and the blue phototransfer gate PTB switch polarities. With each polarity switch, there is a "spill" of whatever charge happens to be on the photogate at the time, through the phototransfer gate and onto the common node 10. In this way, the sequence of "spills" allows charges on the photogates PGR, PGG, and PGB to be sequentially read to the common node 10.

It will be noted that for each spill, such as with PGR and PTR, there are in effect two distinct switches in polarity, the second polarity switch occurring at some selectable predetermined time (indicated by the dotted line in FIG. 2), following the first. It will further be noted that, simultaneous with the second switch in potential, a signal on circuit element PR2 is set high. Referring back to FIG. 1, this pulse on PR2 provides a voltage gradient to a predetermined external voltage VDD (from a source, not shown) to the common node 10. When VDD is applied to the common node simultaneous with a spill of charge from the photogate to the phototransfer gate, all of the charge on the photogate such as PGR spills through the phototransfer gate PTR and through common node 10 and is drawn to VDD: as VDD is preferably a relatively high positive potential, it draws the negative charge from the photogate.

The effect of applying the relatively high potential VDD during the spill is that any charge that had been accumulated on the photogate such as PGR up to that time is removed from the photogate. This "clearing" of a particular photogate at a particular time allows the integration time, during which charge is accumulated in the photogate as a result of light impinging thereon, to start at a precisely-controlled time, thereby allowing precise control of the effective exposure time of the photogate when the apparatus is, for example, scanning a color document. With reference to the claims below, the gate PR2 thus acts a "clearing gate," which selectably applies a predetermined potential on the common node 10, thereby clearing any charge on at least one photogate.

As shown in FIG. 2, the integration time of a particular photogate, such as ITR for the red photogate PGR, is effectively the time between the clearing of the photogate (caused by the application of voltage VDD by PR2) to the subsequent reading out of the charge on the photogate through the phototransfer gate, and the common node, and finally on the output line. This reading out of the charge on the photogate is initiated by a change in polarities relative to the phototransfer gate, as shown in FIG. 2, but during the spill, no pulse is applied to PR2. Instead, a series of pulses are applied as shown to reset gate PR and what is here simply called a transfer gate PT2. As can be seen in FIG. 2, the initial pulse on reset gate PR occurs just before the spill between a photogate such as PGR and phototransfer gate such as PTR. The purpose of this initial pulse on PR is to apply a relatively low voltage Vr onto a reset node 12 on the output line. This setting of a relatively low potential on the reset node 12 is prefatory to applying a pulse on transfer gate PT, which is in series with the output line, so that the charge on a photogate such as PGR can pass through transfer gate PT and toward the reset node 12.

The basic purposes of using the potential $V_r$ on the reset node 12 are to reset the common node 10 to a known potential, which avoids crosstalk between phototransfer gates through common node 10, and to reset the reset node 12 to a known potential, which is related to a predetermined dark level signal for the entire system.

It will be noticed, for each particular spill between a photogate such as PGR and its associated phototransfer gate such as PTR, that the application of potential onto the phototransfer gate is initiated slightly before the drop in potential on the photogate: the purpose of this is simply to ensure efficient transfer of charge from the photogate to the phototransfer gate.

In summary, for each photogate of a particular primary color, the integration time begins with a polarity switch, or spill, between the photogate and the associated phototransfer gate, simultaneous with an application of the relatively high potential VDD on the common node 10 by PR2; the integration time ends with another spill between the photogate and the phototransfer gate, simultaneous with a pulse on PT, which causes the spilled charge on the photogate to migrate toward the potential $V_r$ on reset node 12 and appear on the output line as $V_{out}$. The initial application of VDD during the first spill effectively clears any pre-existing charge on the photogate, so that the photogate can "start from scratch" with zero light-induced charge thereon. In this way, the effective exposure time for the particular photogate can be initiated at a specific time.

As can be seen by dotted lines in the various signals shown in FIG. 2, the clearing of a particular photogate can occur at any selectable time following the output of the photogate onto the output line $V_{out}$. The integration time can thus be controlled by controlling when the "clearing" occurs. When the three photogates such as shown in FIG. 1 are used as a single "cell" in a large array of photosensors, such as in a document scanner, the period between the spill of charge from the photogate onto $V_{out}$, and the subsequent clearing, indicated in the Figure as SR, can be used for momentary holding of the charge from a particular photogate as a potential on $V_{out}$ until the cell is read out, for example, by a stage in a shift register (not shown). (The time proportions of a practical embodiment of the present invention are not shown to scale in the Figure: in one practical system, the duration of each instance of SR, where the dotted lines are present in the Figure, is on the order of 128 clock pulses, while the duration between instances of SR is typically about 32 clock pulses.) The overall architecture of a system in which a large number of photosensor cells are associated with a shift register is given in the patents incorporated by reference above.

Figure 3:
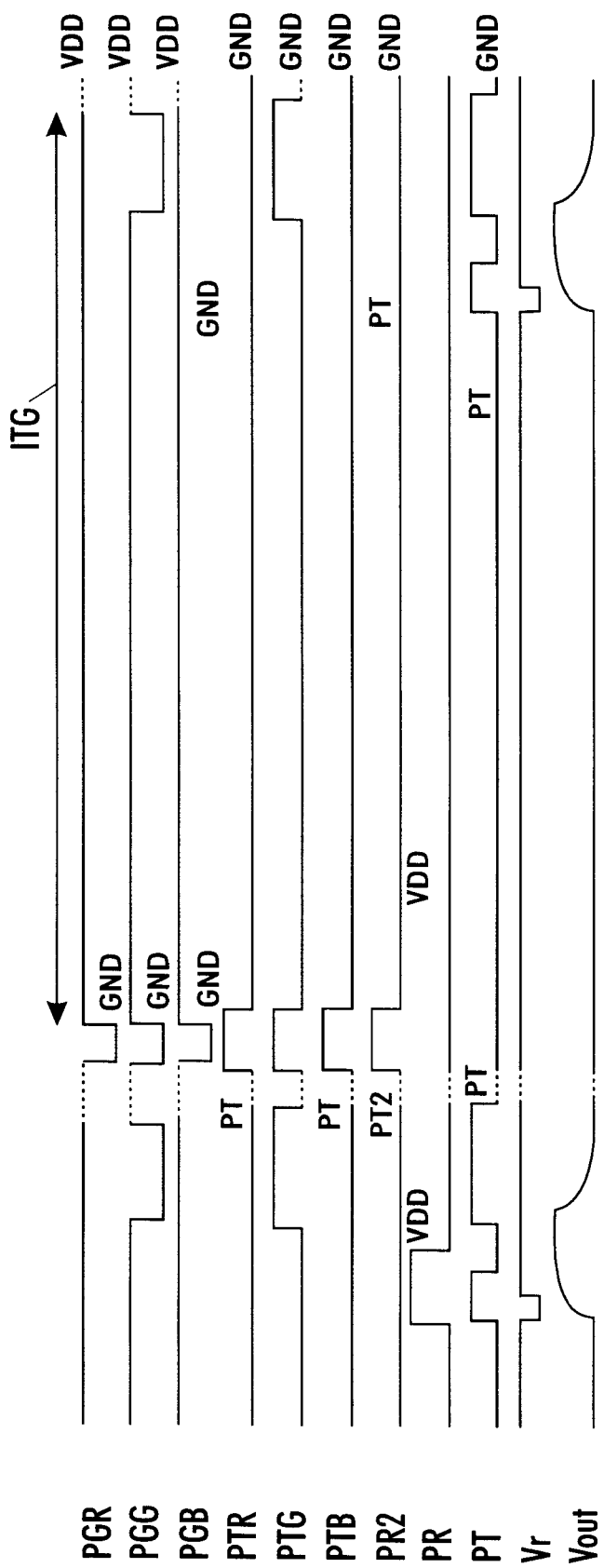
FIG. 3 is another timing diagram showing the application of different potentials to various circuit elements in the schematic of FIG. 1, according to an alternate method of the claimed invention.

FIG. 3 is another timing diagram showing an alternate operation of the circuitry in the pixel cell shown in FIG. 1. Whereas the FIG. 2 timing diagram showed the operation of the circuit in a manner to read out charges in a multiplexed manner from the photogates, FIG. 3 shows how, by merely altering the timings of pulses on the various circuit elements, the same pixel cell can be readily operated in a "monochrome mode." In a monochrome mode, which is very useful for document scanning purposes, only one primary-color photosensor, such as the green photogate PGG, is used, while the other primary-color photosensors PGR and PGB are effectively made inactive. The advantage of monochrome mode is that, if it is known beforehand that all of the input documents are black and white, or if the color on the documents is deemed irrelevant, only one color separation set of data is needed, with a significant saving in both scanning rate (because non-relevant color signals do not have to be read out through a shift register) and in required memory.

As can be seen in FIG. 3, while the green photogate PGG and its associated phototransfer gate PTG operate in the same manner as in FIG. 2, with an integration time indicated as ITG, the red and blue photogates PGR and PGB never spill their charge onto the $V_{out}$ line but are simply periodically cleared by applying VDD thereto with a pulse on PR2. In this way, while the unused photogates PGR and PGB are simply excluded from read out, any negative effects caused by the accumulation of charge thereon is obviated by periodically clearing any charge on the unused photogates. The present invention allows the same basic circuitry of FIG. 1 to operate in a color or monochrome mode simply by altering the pulses on the various circuit elements.

With reference to the claims, any "means" for applying any signal or potential to any circuit element will preferably be in the form of a digital control operating the circuit elements according to recited manner, and such general-purpose digital control systems are well known in the art.

While the invention has been described with reference to the structure disclosed, it is not confined to the details set forth, but is intended to cover such modifications or changes as may come within the scope of the following claims.

What is claimed is:

1. A photosensitive apparatus comprising:
    a first photogate, the first photogate creating a charge in response to light impinging thereon, and a first phototransfer gate associated with the first photogate, a charge in the first photogate spilling into the first phototransfer gate in response to an applied potential difference between the first photogate and the first phototransfer gate;
    a second photogate, the second photogate creating a charge in response to light impinging thereon, and a second phototransfer gate associated with the second photogate, a charge in the second photogate spilling into the second phototransfer gate in response to an applied potential difference between the second photogate and the second phototransfer gate;
    a common node associated with the first phototransfer gate and the second phototransfer gate, the common node being associated with an output line;
    a reset gate disposed at a reset node on the output line, the reset gate adapted to selectably apply a predetermined reset potential to the reset node;
    a clearing gate disposed on the output line between the common node and the reset node, the clearing gate being actuable to apply a predetermined potential on the common node, thereby clearing any charge on at least one of the first photogate or second photogate;
    a transfer gate disposed in series on the output line between the clearing gate and the reset node, adapted to selectably transfer charge from one of the first photogate and the second photogate to the reset node; and
    means for applying a predetermined transfer potential to a selected one of the first phototransfer gate and the second phototransfer gate simultaneously with actuating the clearing gate, thereby clearing charge on a selected one of the first photogate or second photogate and initiating an integration time for the selected one of the first photogate or second photogate, whereby the integration time of the first photogate can be controlled independently of the integration time of the second photogate.

2. In a photosensitive apparatus comprising:
    a first photogate, the first photogate creating a charge in response to light impinging thereon, and a first phototransfer gate associated with the first photogate, a charge in the first photogate spilling into the first phototransfer gate in response to an applied potential difference between the first photogate and the first phototransfer gate;
    a second photogate, the second photogate creating a charge in response to light impinging thereon, and a second phototransfer gate associated with the second photogate, a charge in the second photogate spilling into the second phototransfer gate in response to an applied potential difference between the second photogate and the second phototransfer gate;
    a common node associated with the first phototransfer gate and the second phototransfer gate, the common node being associated with an output line;
    a clearing gate disposed on the output line, the clearing gate being actuable to apply a predetermined potential on the common node; and
    a transfer gate disposed in series on the output line between the clearing gate and the reset node, adapted to selectably transfer charge from one of the first photogate and the second photogate to the reset node,
    a method of operating the apparatus, comprising the step of:
    applying a predetermined transfer potential to a selected one of the first phototransfer gate and the second phototransfer gate simultaneously with actuating the clearing gate, thereby clearing charge on a selected one of the first photogate or second photogate and initiating an integration time for the selected one of the first photogate or second photogate, whereby the integration time of the first photogate can be controlled independently of the integration time of the second photogate.

3. The method of claim 2, further comprising the step of applying a predetermined transfer potential to a selected one of the first phototransfer gate and the second phototransfer gate without actuating the clearing gate, thereby transferring charge on the selected one of the first photogate or second photogate to the output line and terminating the integration time for the selected one of the first photogate or second photogate.

4. The method of claim 2, further comprising the step of always actuating the clearing gate when applying a predetermined transfer potential to the second phototransfer gate, thereby preventing transfer of charge form the second photogate to the output line.

5. The apparatus of claim 1, wherein the first photogate is sensitive to a first color, and the second photogate is sensitive to a second color.

6. The method of claim 2, wherein the first photogate is sensitive to a first color, and the second photogate is sensitive to a second color.

* * * * *